US008286919B2

(12) United States Patent
Gerken et al.

(10) Patent No.: US 8,286,919 B2
(45) Date of Patent: Oct. 16, 2012

(54) IMPACT RESISTANT COMPOSITE STRUCTURES

(75) Inventors: Noel T Gerken, Maple Valley, WA (US); Michael P. Thompson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 732 days.

(21) Appl. No.: 12/350,941

(22) Filed: Jan. 8, 2009

(65) Prior Publication Data

US 2009/0283635 A1 Nov. 19, 2009

Related U.S. Application Data

(63) Continuation-in-part of application No. 12/119,561, filed on May 13, 2008.

(51) Int. Cl.
*B64C 1/00* (2006.01)
(52) U.S. Cl. ........... 244/133; 244/121; 89/904; 442/135
(58) Field of Classification Search ................. 244/133, 244/121, 119; 442/135, 134; 89/904, 903, 89/36.02
See application file for complete search history.

(56) References Cited

U.S. PATENT DOCUMENTS

| | | | |
|---|---|---|---|
| 4,049,309 A | 9/1977 | Seal | |
| 4,623,951 A * | 11/1986 | DuPont et al. | 361/218 |
| 4,686,806 A | 8/1987 | Bennett | |
| 4,937,125 A | 6/1990 | Sanmartin | |
| 4,957,577 A | 9/1990 | Huebner | |
| 6,114,050 A * | 9/2000 | Westre et al. | 428/608 |
| 6,245,407 B1 | 6/2001 | Wang et al. | |
| 6,440,527 B2 | 8/2002 | Prins et al. | |
| 6,558,783 B1 | 5/2003 | Kato et al. | |
| 6,568,310 B2 * | 5/2003 | Morgan | 89/36.02 |
| 6,591,949 B2 | 7/2003 | Kitano et al. | |
| 6,620,905 B1 | 9/2003 | Musa | |
| 6,679,969 B1 * | 1/2004 | Fournier et al. | 156/245 |
| 6,712,318 B2 * | 3/2004 | Gubert et al. | 244/171.7 |
| 6,743,852 B2 | 6/2004 | Dershem et al. | |
| 7,125,624 B2 | 10/2006 | Tanno | |
| 7,157,509 B2 | 1/2007 | Li et al. | |
| 7,601,654 B2 * | 10/2009 | Bhatnagar et al. | 442/135 |
| 7,703,375 B1 * | 4/2010 | Scott et al. | 89/36.02 |
| 7,735,407 B2 * | 6/2010 | Keener et al. | 89/36.02 |
| 2002/0100840 A1 | 8/2002 | Billinger et al. | |
| 2002/0179390 A1 * | 12/2002 | Kitano et al. | 188/371 |
| 2007/0238379 A1 * | 10/2007 | Bhatnagar et al. | 442/135 |
| 2008/0032089 A1 | 2/2008 | Bauer et al. | |
| 2009/0286040 A1 | 11/2009 | Gerken et al. | |
| 2010/0258673 A1 * | 10/2010 | Garcia Laja et al. | 244/121 |
| 2011/0088542 A1 * | 4/2011 | Park et al. | 89/36.02 |
| 2011/0108359 A1 * | 5/2011 | Nishimura et al. | 181/290 |

OTHER PUBLICATIONS

USPTO office action dated Aug. 25, 2011, regarding U.S. Appl. No. 12/119,561, 6 pages.
Response to office action dated Dec. 1, 2011, regarding U.S. Appl. No. 12/119,561, 15 pages.
USPTO notice of allowance dated Dec. 27, 2011, regarding U.S. Appl. No. 12/119,561, 6 pages.
USPTO Notice of Allowance dated Mar. 13, 2012 regarding U.S. Appl. No. 12/119,561, 9 pages.

* cited by examiner

*Primary Examiner* — Christopher P Ellis
(74) *Attorney, Agent, or Firm* — Yee & Associates, P.C.

(57) ABSTRACT

An impact resistant composite sandwich structure includes least one laminate face sheet joined to a stiffening element. The stiffening element includes a plurality of fibers and a resin for binding the fibers. The resin has a strain-to-failure greater than approximately 6%.

23 Claims, 4 Drawing Sheets

IMPACT RESISTANT COMPOSITE STRUCTURES

CROSS REFERENCE TO RELATED APPLICATIONS

This application is a continuation-in-part of U.S. patent application Ser. No. 12/119,561 filed May 13, 2008, the entire disclosure of which is incorporated by reference herein.

TECHNICAL FIELD

This disclosure generally relates to composite structures, and deals more particularly with a sandwich type structure having a core exhibiting improved impact resistance.

BACKGROUND

Composite structures that include a core sandwiched between face sheets are used for many purposes. Often, the core includes cells or air pockets to reduce the weight of the composite structure as compared to a similar structure made from solid materials (i.e., materials without cells or air pockets). The reduced weight of these composite structures has led the aircraft industry to use such composite structures to reduce the weight of aircraft components.

In sandwich structures, the core can serve several purposes, such as providing stiffness to the structure, insulating the structure, providing thickness to the structure to achieve desired dimensional characteristics, to offset the face sheets, to support and stabilize the face sheets, etc. However, there can be trade-offs with using sandwich composite structures rather than solid materials. For example, sandwich-type composite structures may have less than desired material performance characteristics, such as lower resistance to impact damage, compared to solid structures. Accordingly, there is a need for improved cores that provide greater impact resistance, which may enable a greater range of uses of the sandwich composite structures.

SUMMARY

The disclosed embodiments provide improved sandwich type composite structures having cores exhibiting increased resistance to impact forces. When used for aircraft applications, the disclosed composite structures may reduce maintenance and inspection costs while allowing use over a wider range of applications on aircraft, including the use of sandwich type panels for primary structure components of the aircraft.

According to one disclosed embodiment, a composite sandwich structure comprises a stiffening element joined to at least one laminate facesheet. The stiffening element includes a plurality of fibers bound by a resin binder having a strain-to-failure greater than approximately 6%. In one embodiment, the resin may include benzoxazine. The fibers of the stiffening element may comprise carbon fibers and/or glass fibers randomly oriented in a non-woven mat that may form a honeycomb core. The composite sandwich structure may exhibit barely visible impact damage (BVID) when exposed to an impact energy of at least approximately 250 inch pounds, where BVID is defined as damage with a depth of 0.040 inches, sometimes called dent depth.

According to another embodiment, a core structure comprises at least one non-woven sheet and a high strain binding resin. The sheet may include at least one of carbon and glass fibers.

According to a further embodiment, a panel comprises a first facesheet, a second facesheet and a honeycomb core sandwiched between the first and second facesheets. The honeycomb core includes a plurality of non-woven fibers. A high strain resin binds the non-woven fibers together. The honeycomb core may also include a plurality of fibrids binding the randomly oriented fibers.

According to still another embodiment, an aircraft component comprises a stiffening element joined to at least one laminate facesheet. The stiffening element includes a plurality of fibers, including at least one of glass fibers and carbon fibers. A high strain resin is used to bind the fibers. The aircraft component may comprise at least a portion of a primary structural member or at least a portion of a secondary structural member.

Another disclosed embodiment provides a method of making a structural core. A plurality of fibers are wetted with a high strain resin. The wetted fibers are formed into corrugations. The resin is cured and a honeycomb is formed by bonding a plurality of the corrugations together.

BRIEF DESCRIPTION OF THE ILLUSTRATIONS

DETAILED DESCRIPTION

The features, functions, and advantages that have been discussed can be achieved independently in various embodiments disclosed herein or may be combined in yet other embodiments further details of which can be seen with reference to the following description and drawings.

By way of introduction, in a particular embodiment, an impact resistant core can be made by shaping a plurality of fibers into a desired configuration (such as a honeycomb structure) and binding the fibers together using a resin. Impact resistant cores made in this manner can be used as stiffening elements in sandwich composite structures to make parts that are lightweight and durable. For example, the impact resistant cores can be used to make various aircraft components. The sandwich composite structures can include one or more laminate face sheets coupled to the core. When the impact resistant core is to be used to make aircraft components, the resin and the fibers may be selected to reduce thermal expansion, to provide sufficient strength and stiffness to the aircraft component, to reduce moisture absorption, and to meet aircraft component smoke and toxicity requirements.

In a particular embodiment, an impact resistant core may be made using non-woven poly p-phenylene-2,6-benzobisoxazole (PBO) fibers. For example, the non-woven PBO fibers can include a mat of chopped PBO fibers arranged in a random or unstructured manner. In another example, the non-woven PBO fibers can be bound by a plurality of fibrids (expanded fibers) in a PBO paper. The fibrids can include PBO fibrids, poly m-phenylene isophthalamide (NOMEX™) fibrids, poly paraphenylene terephthalamide (KEVLAR™) fibrids, or fibrids made from other polymer fibers.

In a particular embodiment, the fibers can be bound using a polybenzoxazine (BXA) resin. The resin can be applied to the fibers by dipping the fibers in the resin, by painting or spraying the resin onto the fibers, using other application techniques, or any combination thereof. Additionally, the resin can be applied to the fibers before the fibers are shaped in the desired configuration (e.g., by pre-impregnating fiber sheets with the resin) or after the fibers have been shaped into a desired configuration (e.g., by dipping or spraying the shaped fibers).

Figure 1:
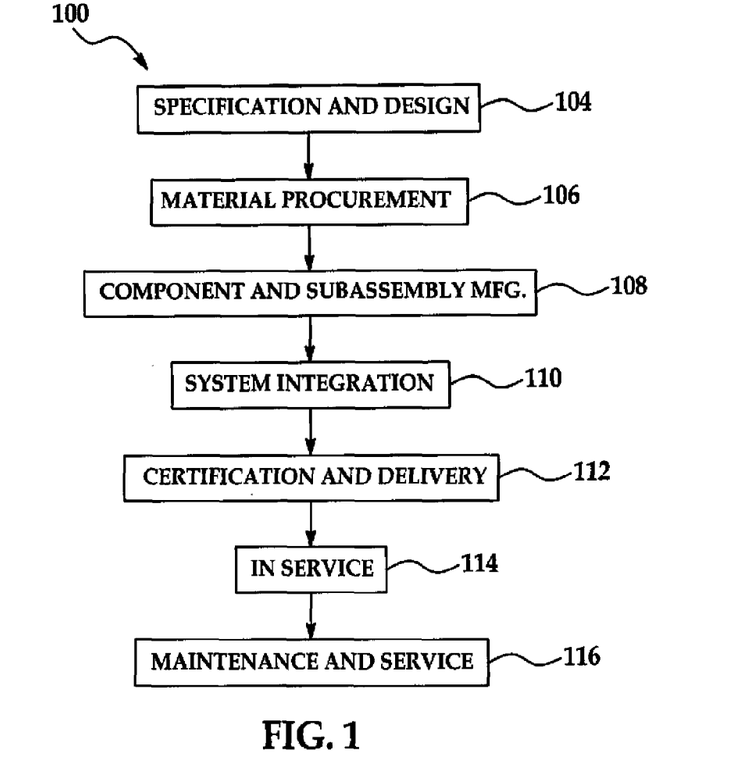
FIG. 1 is a flow diagram of an aircraft production and service methodology.
Figure 2:
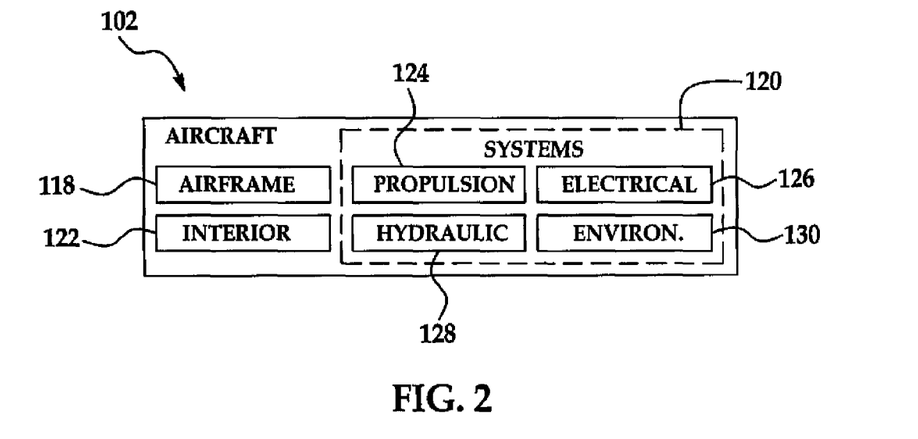
FIG. 2 is a block diagram of an aircraft.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the various embodiments may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 3:
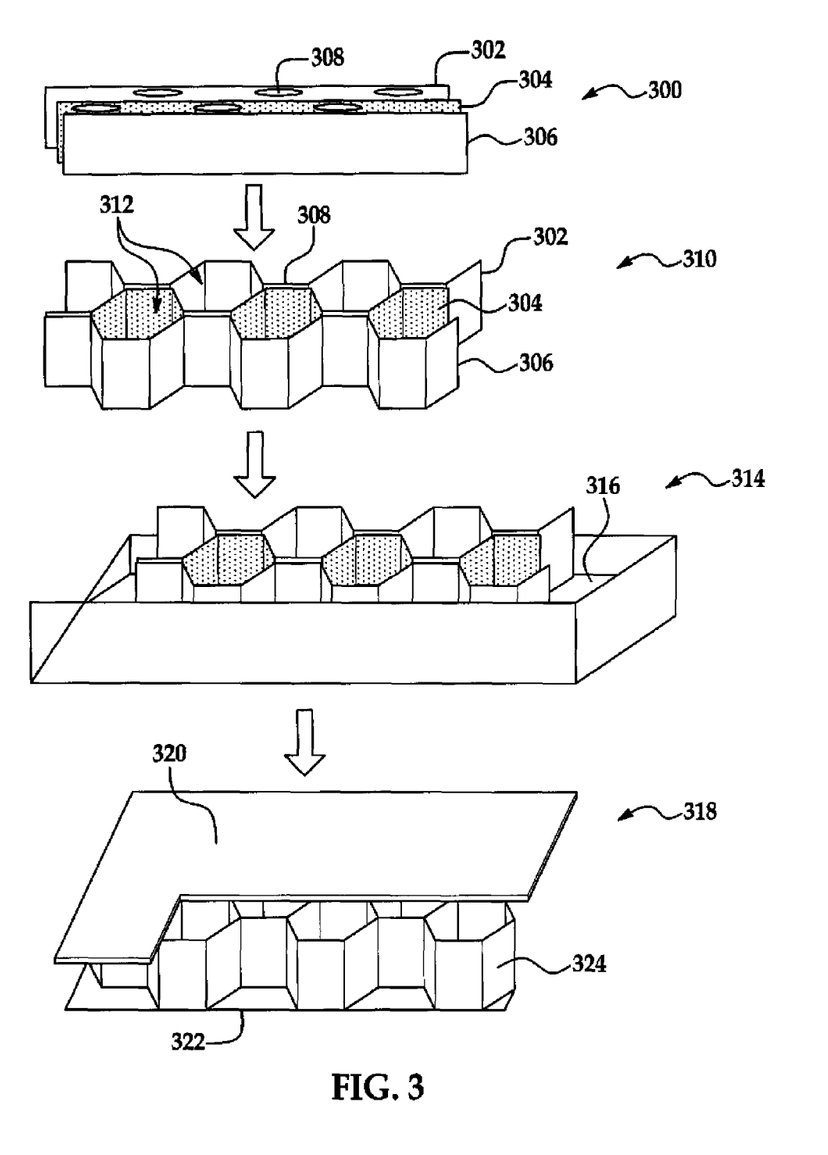
FIG. 3 is an illustration of a first particular embodiment of a method of manufacturing impact resistant core.

FIG. 3 illustrates a first particular embodiment of a method of manufacturing an impact resistant core. The impact resistant core 324 may include a plurality of non-woven fiber sheets 302, 304, 306 and a binding resin 316. In a particular embodiment, the binding resin 316 includes a benzoxazine-based resin such as a polybenzoxazine (BXA) resin, a phenolic resin, another polymer resin, or any combination thereof. In a particular embodiment, at least one of the non-woven fiber sheets 302, 304, 306 may include multiple glass, carbon or poly p-phenylene-2,6-benzobisoxazole (PBO) fibers. For example, the non-woven fiber sheets 302, 304, 306 can include mats of chopped glass, carbon and/or PBO fibers in a random or unstructured orientation. In another example, the non-woven fiber sheets 302, 304, 306 can include a paper including glass, carbon and/or PBO fibers bound with fibrids (expanded fibers), such as expanded glass, carbon and/or PBO fibers, expanded NOMEX™ fibers, expanded KEVLAR™ fibers, other expanded polymer fibers, or any combination thereof. Both mats and papers are referred to generally herein as sheets.

At 300, an adhesive 308 has been applied to the non-woven fiber sheets 302, 304, 306 to bind the non-woven fiber sheets 302, 304, 306 together. After the adhesive 308 is cured, the non-woven fiber sheets 302, 304, 306 can be pulled away or expanded from each other, at 310, to make cells 312. The shape and size of the cells 312 is dependent upon where the adhesive 308 is applied to the non-woven fiber sheets 302, 304, 306. The shape and size of the cells 312 may also be dependent upon other process characteristics, such as, how far apart the non-woven fiber sheets 302, 304, 306 are pulled. In the particular embodiment illustrated in FIG. 3, the cells 312 are substantially hexagonal; however, in other embodiments, the cells 312 can be substantially rectangular, irregular or any other shape according to the design of the particular core. The shape, size and placement of the adhesive 308 may also vary, depending on the application and desired geometry of the cells 312.

After the cells 312 are made, the binding resin 316 can be applied to the non-woven fiber sheets 302, 304, 306. For example, at 314, the non-woven fiber sheets 302, 304, 306 can be submerged in the binding resin 316 (e.g., by dipping at least a portion of the non-woven fiber sheets 302, 304, 306 in the binding resin 316, by dispensing the binding resin 316 to cover the non-woven fiber sheets 302, 304, 306, and so forth). In other embodiments, the binding resin 316 can be applied to the non-woven fiber sheets 302, 304, 306 by spraying, painting, any other application process, or any combination thereof.

After the binding resin 316 is cured, the completed impact resistant core 324 can be used in a sandwich structure, at 318, by coupling one or more laminating face sheets 320, 322 to the impact resistant core 324. The sandwich structure can be used for a variety of purposes, such as to make aircraft components.

Figure 4:
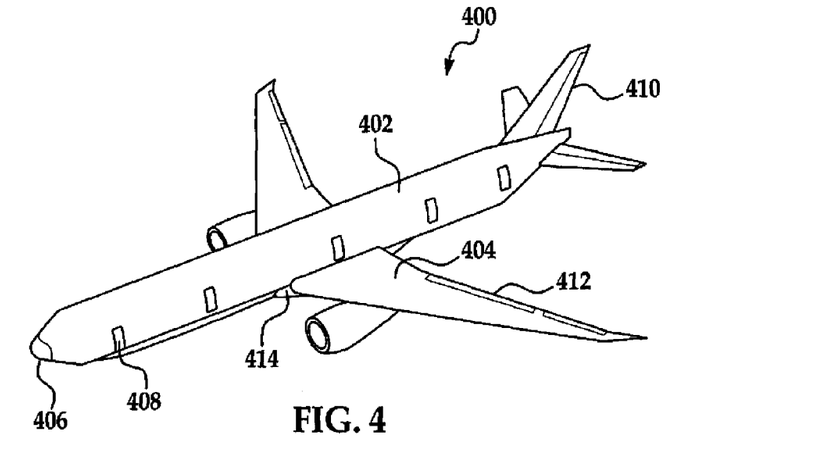
FIG. 4 is an illustration of a particular embodiment of an aircraft including one or more components made using an impact resistant core.

FIG. 4 depicts a particular embodiment of an aircraft 400 including one or more components made using the impact resistant core 324 illustrated in FIG. 3. The aircraft 400 includes a plurality of primary structural members and a plurality of secondary structure members.

The primary structural members include load-bearing components, such as, without limitation, a fuselage 402 and wings 404. The secondary structure members include, without limitation, non-load-bearing components, such as radomes 406, doors 408, control surfaces, such as horizontal control surfaces 412 (e.g., slats, flaps, ailerons, elevators, air brakes, etc.) and vertical control surfaces 410 (e.g., rudders), and fairings 414. The secondary structural members can also include a large number of other members such as aircraft engine cowls, and service access panels, as well as interior components, such as bulkheads, interior doors, interior cabinets, flooring, and so forth.

An aircraft component, such as one of the primary structural members or one of the secondary structural members, may include at least one laminate face sheet and at least one stiffening element. In a particular embodiment, the at least one stiffening element includes a plurality of fibers and a BXA binding resin. The plurality of fibers may include one or more sheets of non-woven glass, carbon and/or PBO, such as fiber mats or fiber paper. In another particular embodiment, at least one stiffening element includes a plurality of non-woven glass, carbon and/or PBO fibers and a binding resin. The plurality of non-woven fibers may be randomly oriented or oriented in an unstructured manner. Additionally, the stiffening element may include a plurality of fibrids binding the non-woven fibers. The fibrids may include expanded glass, carbon and/or PBO fibers, or expanded fibers of another polymer such as NOMEX™ or KEVLAR™. The binding resin can include BXA, a phenolic resin, or another polymer resin. In an illustrative embodiment, the laminate face sheet may be the laminate face sheet 320 or 322 of FIG. 3, and the at least one stiffening element may be the impact resistant core 324 of FIG. 3.

In a particular embodiment, aircraft structural members, such as interior members, may be subject to various fire safety standards, such as smoke and toxicity requirements, in order to be deemed airworthy. Impact resistant cores made in accordance with various embodiments using glass, carbon and/or PBO fibers and BXA binding resin may comply with current fire safety standards, such as smoke and toxicity burn characteristics. Additionally, such fibers and BXA binding resin impact resistant cores have relatively good moisture absorption and thermal capabilities relative to cores made using fiberglass, NOMEX™ and KEVLAR™.

Figure 5:
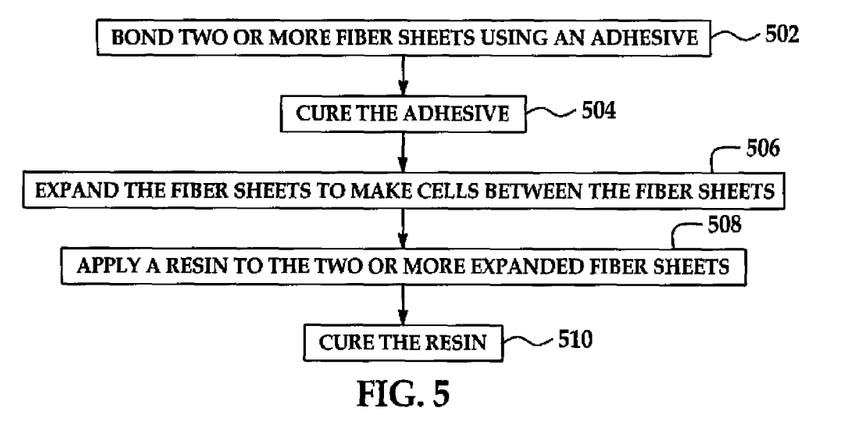
FIG. 5 is an illustration of operations performed in the first particular embodiment of a method of making an impact resistant core.

FIG. 5 depicts a first particular embodiment of a method of making an impact resistant core. In a particular embodiment, the method depicted in FIG. 5 can be used to make a honeycomb core, such as impact resistant core 324 depicted in FIG. 3.

The method includes, at 502, bonding two or more fiber sheets using an adhesive. The fiber sheets may include glass, carbon and/or poly p-phenylene-2,6-benzobisoxazole (PBO) fibers. The method also includes, at 504, curing the adhesive. In a particular embodiment, the adhesive can include an epoxy adhesive. In another particular embodiment, the adhesive can include a polybenzoxazine (BXA) adhesive. The adhesive may be applied to the two or more fiber sheets in stripes such that when the adhesive has cured the fiber sheets can be expanded (e.g., by pulling the sheets away from one another), at 506, to make cells between the fiber sheets.

The method also includes, at 508, applying a resin to the two or more expanded fiber sheets. For example, the resin can be sprayed on the fiber sheets, the expanded fiber sheets can be dipped into the resin, or any other application process or combination thereof can be used to apply the resin to the two or more expanded fiber sheets. The method also includes, at 510, curing the resin. In a particular embodiment, the resin includes a BXA resin, a phenolic resin, or any other polymer resin suitable for the particular use for which the impact resistant core will be employed. For example, where the impact resistant core will be used to make an aircraft component, the resin may be selected based on burn characteristics, water absorption characteristics, thermal expansion characteristics, other material characteristics of the resin related to airworthiness, or any combination thereof. In one particular embodiment, a BXA resin exhibiting a strain-to-failure of approximately 7 to 8% was found to be suitable, however other high-strain resins may be successfully employed to make impact resistant cores for aircraft components, as will be discussed in more detail below.

Figure 6:
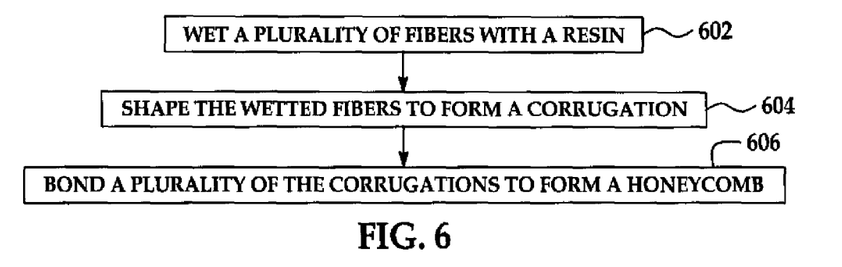
FIG. 6 is an illustration of operations performed in a second particular embodiment of a method of making an impact resistant core.

FIG. 6 depicts a second particular embodiment of a method of making an impact resistant core. The method embodiment depicted in FIG. 6 can be used to make a core, such as impact resistant core 324 depicted in FIG. 3. The method includes, at 602, wetting a plurality of fibers, such as glass fibers, carbon fibers or poly p-phenylene-2,6-benzobisoxazole (PBO) fibers, with a resin. For example, the fibers can be pre-impregnated with the resin. In another example, the fibers can be coated in the resin (e.g., by dipping, submerging, spaying, painting, or otherwise applying the resin to the fibers). In a particular embodiment, the fibers may have a random or unstructured orientation with respect to one another. For example, the fibers can include sheets of the fibers, such as fiber mat, fiber paper, or any other non-woven sheet of fibers.

The method also includes, at 604, shaping the wetted glass, carbon and/or PBO fibers to form a corrugation. For example, the wetted PBO fibers may be applied to a tool or mandrel that has a desired shape of the corrugation and the resin may be cured. In another example, the fibers can be folded to the shape of the corrugation.

The method also includes, at 606, bonding a plurality of corrugations together to make a core. For example, the corrugations can be bonded to make a core, such as the impact resistant core 324 of FIG. 3. The core 324 may include a plurality of cells with each cell having a cross sectional shape and size that is selected based upon an intended end use of the core and fabrication techniques used to make the core. For example, the core cells may be substantially hexagonal, rectangular, triangular, circular, irregular or any other suitable shape.

In particular embodiments, the impact resistant cores and composite structures made using those cores that are disclosed herein may have particular advantage when used to make aircraft components. For example, sandwich composites structures made using glass, carbon and/or PBO fiber in certain forms of reinforcement, and BXA resin cores have relatively high impact resistance. As a result of the improved impact resistance, aircraft components made using such cores may be damaged less frequently or less severely requiring significantly less inspection, repair and/or replacement than traditional skin and stringer structures or honeycomb structures made using fiberglass fabric, NOMEX™ or KEVLAR™. Additionally, the glass, carbon and/or PBO fiber and BXA resin cores have other characteristics that may be beneficial for aircraft components, such as improved strength and stiffness. Further, the glass, carbon and/or PBO fiber and BXA resin cores have suitable thermal capabilities, moisture absorption and burn characteristics (e.g., fire resistance and smoke toxicity) for use in aircraft components.

Tests of mechanical properties of PBO fiber and BXA resin cores according to disclosed embodiments have been performed with representative results summarized in Table 1. The tests showed unexpected improvements in impact resistance for the PBO fiber and BXA resin cores relative to NOMEX™, KEVLAR™ and fiberglass fabric based cores made with phenolic resins. For the tests, each core was faced with a face sheet including a laminate skin using 7-ply Toray P2352W19 unidirectional carbon tape/epoxy (available from Toray Composites of Tacoma Wash.) in quasi-isotropic orientation and 1-ply of Cytec Metlbond 1515-3M-.03 PSF film adhesive (available from Cytec Engineered Materials of Anaheim, Calif.). Each tested core was approximate 1-inch thick and had a honeycomb configuration (i.e., substantially hexagonal cells). The impact resistance of each sandwich structure was tested for barely visible impact damage (BVID), defined as the amount of energy, measured in inch-pounds, that would result in a dent or damage in the sandwich structure having a depth of inch.

TABLE 1

| Item # | Resin | Fiber | Cell Geometry | BVID impact energy (in-lb) |
|---|---|---|---|---|
| 1 | Phenolic | KEVLAR ™ | 1/8" hexagon | 175 |
| 2 | Phenolic | NOMEX ™ | 1/8" hexagon | 150 |
| 3 | Phenolic | Fiberglass | 3/16" hexagon | 150 |
| 4 | BXA | PBO fabric | 3/16" hexagon | 300 |
| 5 | BXA | PBO mat | 0.14" hexagon | 425 |

The observed BVID impact damage energy for a KEVLAR™ based core with phenolic resin, such as item #1 in Table 1, was 175 inch pounds (in-lb). The observed BVID impact damage energy for a NOMEX™ based core with phenolic resin, such as item #2 in Table 1, was 150 inch pounds. The observed BVID impact damage energy for a fiberglass fabric based core with phenolic resin, such as item #3 in Table 1, was 150 inch pounds. Testing showed that the BVID impact energy for the PBO fabric (that is woven PBO fibers) and BXA resin core, such as item #4 in Table 1, was approximately 300 inch pounds. However, the BVID impact energy for unwoven PBO fiber, specifically, PBO mat and BXA resin core, such as item #5 in Table 1, was 425 inch pounds.

The data summarized in Table 1 are for general comparison purposes and are not intended as limiting. The data indicate generally that cores made with PBO fibers and BXA resin can have impact energies greater than 200 inch pounds. For example, cores made with PBO fabrics and BXA resin can have BVID impact energies greater than 300 inch pounds, and cores made with non-woven PBO fibers and BXA resin can have BVID impact energies greater than 400 inch pounds.

In addition to the advantages illustrated in Table 1, where sandwich structures made using the disclosed PBO fibers, BXA resin, or both, are used to replace skin and stringer for primary structural members in aircraft, there may be significant weight reduction due to the reduced weight of the sandwich structures relative to the skin and stringer structures.

Figure 7:
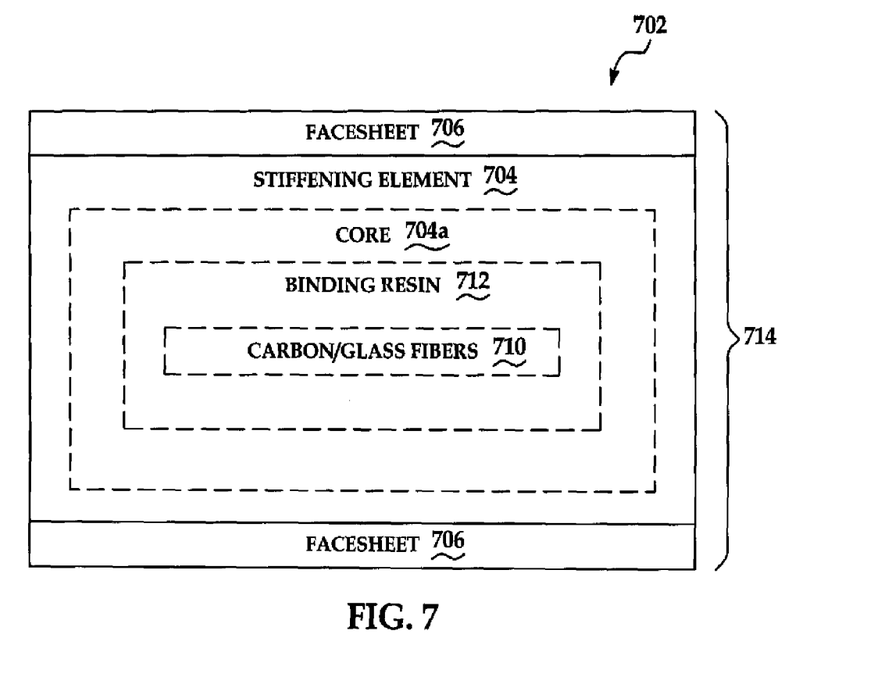
FIG. 7 is a block diagram of a composite sandwich structure

Attention is now directed to FIG. 7 which illustrates, in block diagram form, an alternate composite sandwich structure generally indicated by the numeral 702 which may be used to form, for example and without limitation, a composite panel 714. The sandwich structure 702 includes a stiffening element 704 which may comprise, without limitation, a core 704a, sandwiched between a pair of composite laminate facesheets 706, 708. In the illustrated embodiment, the core 704a is a honeycomb core configuration, however it should be note that a wide range of other core configurations are possible. The core 704a may include either glass or carbon fibers 710, or a combination of glass and carbon fibers 710, randomly oriented in a non-woven mat and held in a high strain resin binder 712. The stiffening element 704 may also include fibrids binding the randomly oriented fibers 710 together. As used herein "mat" and "mat form" refer to a reinforcement utilizing non-woven fibers, which generally may not contain substantial amounts of pulp, and may not be calendered. In contrast, a paper reinforcement generally contains pulp and is calendered. Also, as used herein, "high strain binder" and "high strain resin binder" refer to a resin binder used to bind the carbon and/or glass fibers which has a strain-to-failure capability greater than approximately 6%. "Strain-to-failure" is used in its normal sense, to mean the amount a material (in this case the binding resin 712) may deform in response to an applied stress before the material fails. Each of the facesheets 706, 708 may comprise multiple plies of reinforcing fibers held in a resin binder, such as, without limitation, carbon fiber epoxy.

Any of various resins may be used as the high strain binding resin 712, providing that the resin possesses greater than approximately 6% strain-to-failure. For example, and without limitation, one material suitable for use as the high strain binding resin 712 is benzoxazine, also sometimes referred to as polybenzoxazine (collectively "BXA"). BXA is a thermosetting resin similar to epoxy which exhibits properties desirable for a core and the manufacture thereof. These properties include a relatively high strain-to-failure, low cure shrinkage, and low cure heat release. BXA also exhibits good latency (stability), ease of dilution with standard solvents, the ability to modify chemistry to alter physical properties, low moisture absorption, and high hot/wet property retention. Further desirable properties of BXA include high compression strength and modulus, good adhesion to fibers and excellent fire, smoke, and toxicity performance. Formulations of BXA providing approximately 7%-8% strain-to-failure are known to be commercially available. It is believed that the higher strain-to-failure exhibited by the high strain binding resin 712 may provide improved toughness and fracture resistance.

As previously discussed, the use of glass and/or carbon fibers 710 in a randomly oriented, mat form may be used in combination with a high strain binding resin 712 to form a stiffening element 704 such as the core 704a exhibiting superior BVID performance which may exceed approximately 250 in/lb. The loose arrangement of the fibers 710 in a non-woven mat form may render the core 704a relatively compliant, which may increase the impact resistance of the sandwich structure 702.

Tests of mechanical properties of glass and carbon fiber mat cores 704a impregnated with a high strain resin 712 have been performed with representative results summarized in Table 2 below. The tests showed improvements in impact resistance for high strain resin based cores 704a employing glass and carbon fibers 710 relative to KEVLAR, NOMEX and fiberglass fabric cores using a phenolic resin.

For these tests, a BXA binding resin 712 having a strain-to-failure of approximately 7 to 8% was used, and each core 704a was faced with a facesheet including a laminate skin comprising a 0.055 inch thick, 7-ply unidirectional carbon tape/epoxy in quasi-isotropic orientation, and one ply of film adhesive. Each tested core was approximately one inch thick, with a density of 3 to 4 pounds per cubic foot and had a hexagonal honeycomb cell configuration. The impact resistance of each sandwich structure was tested for BVID, which was determined as 0.04 in. dent depth.

TABLE 2

| Core | Resin | Reinforcement | Geometry | Density, pcf | BVID impact energy, in-lb |
|---|---|---|---|---|---|
| Kevlar 3# | phenolic | Kevlar N636 paper | 1/8" hex. | 3 | 175 |
| Nomex 3# | phenolic | Nomex paper | 1/8" hex. | 3 | 150 |

TABLE 2-continued

| Core | Resin | Reinforcement | Geometry | Density, pcf | BVID impact energy, in-lb |
|---|---|---|---|---|---|
| HRP 4# | phenolic | fiberglass fabric | 3/16" hex. | 4 | 150 |
| Carbon-Based | BXA | carbon mat | Bell-shape | 4.9 | 575 |
| Fiberglass-Based | BXA | fiberglass mat | Bell-Shape | 4.8 | 650 |
| Kevlar 3# | phenolic | Kevlar N636 paper | 1/8" hex. | 3 | 175 |
| Nomex 3# | phenolic | Nomex paper | 1/8" hex. | 3 | 150 |
| HRP 4# | phenolic | fiberglass fabric | 3/16" hex. | 4 | 150 |
| Carbon-Based | BXA | carbon mat | Bell-shape | 4.9 | 575 |
| Fiberglass-Based | BXA | fiberglass mat | Bell-Shape | 4.8 | 650 |

The observed BVID impact damage energy for the KEVLAR, NOMEX and HRP cores using phenolic resin were 175, 150 and 150 in/lbs, respectively, essentially the same as those listed in Table 1 above. However, as shown in Table 2, a sandwich structure 702 having a core 704a formed from a non-woven carbon fiber mat using a BXA binding resin 712 with a 7 to 8% strain-to-failure achieved a BVID impact energy of 575 in/lbs. A sandwich structure 702 employing a non-woven fiberglass mat core 704a and a BXA binding resin 712 with a 7 to 8% strain-to-failure achieved a BVID impact energy of 650 in./lbs. In these examples, the sandwich structure 702 having the non-woven carbon fiber mat reinforcement in the core 704a contained approximately 20% to 65% of carbon fibers 710, by weight with the balance of the core 704a comprising the following constituents: pulp, binder, and resin matrix. Similarly, the tested sandwich structure 702 having the non-woven glass fiber mat reinforcement in the core 704a contained approximately 20% to 65% of glass fibers 710, by weight, with the balance of the core 704a comprising the following constituents: pulp, binder, and resin matrix.

The BVID impact energy achieved by a particular sandwich structure 702 having carbon fiber and/or glass fiber based cores 704a and a high strain binding resin 712 may depend upon the amount of these fibers 710 that are used in the core 704a. However, generally, cores 704a containing either carbon fibers 710, glass fibers 710 or a combination of glass and carbon fibers 710 in a randomly oriented, mat form constituting at least 20% by weight of the total content of the core 704 may provide BVID impact energies exceeding approximately 250 in/lbs. In fact, superior BVID impact energy may be achieved in sandwich structures 702 having cores 704a with mats containing carbon fibers and/or glass fibers and a high strain binding resin 712 may exhibit markedly superior BVID impact energy when the carbon fiber and/or glass fiber content is within a range of approximately 20% to 65%. The BVID achieved in a particular application may depend upon additional mechanical properties that may be required for the application, including strength requirements.

The mechanical properties of a sandwich structure 702 may depend on a variety of variables which may also affect, to some degree, the BVID. For example, BVID and mechanical properties may be affected by variables in the formulation used to form the core 704a, including but not limited to: the fiber type; the pulp material; the fiber-to-pulp ratio; the binder material; the particular formulation of the binding resin 712; the length of the reinforcing fibers 710; the dendricity of the pulp; the degree of calendering; and, the percentage of the binding resin 712 that is employed. Generally, the inclusion of pulp, and calendering of the materials used to form the core 704a may increase stiffness of the core 704a, and thus reduce the impact resistance of the sandwich structure 702. Nevertheless, for a particular application having prescribed mechanical property requirements, a core 704a employing a glass and/or carbon fiber mat with a high strain resin binder 712 may provide three to four times greater impact resistance compared to sandwich structures employing other types of fibers and woven materials.

Sandwich structures 702 according to the disclosed embodiments may achieve improved BVID impact energy without substantially compromising the mechanical properties of the sandwich structure 702 through the use of additional constituent materials in the core 704a, including without limitation, a polyvinyl alcohol (PVA) micro-fiber binder, fiberglass micro-fibers, aramid pulp or fibrids, and aramids formed into a paper. Both the binding resin 712 (FIG. 7) and the adhesive 308 (FIG. 3) used to join the fiber sheets 302, 304 (FIG. 3) of a core 704a may be based on a high strain type binding resin 712 as previously described.

Figure 8:
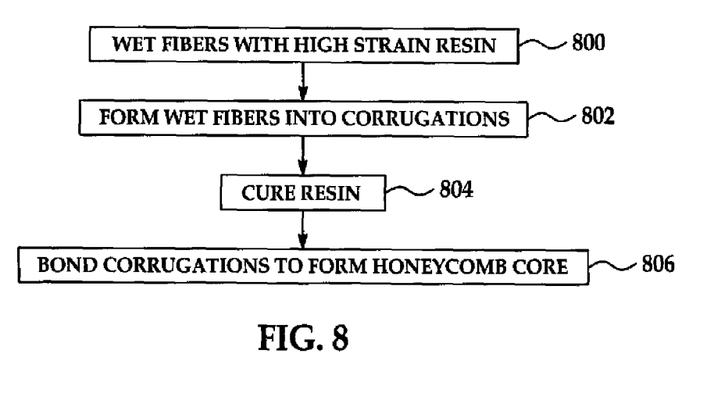
FIG. 8 is a flow diagram illustrating a method of making a structural core.

Referring now to FIGS. 7 and 8, a method for making the structural core 704a begins at step 800, in which glass and/or carbon fibers 710 are wetted with a high strain resin 712 that binds the fibers 710 together. At 802, the wetted fibers 710 are then formed into corrugations (not shown). The resin is cured at 804, following which at 806, the corrugations may be bonded together to form a core 704a.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, the claimed subject matter may be include less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present claimed subject matter is to be determined by the broadest permissible interpretation of the following claims and their equivalents, and shall not be restricted or limited by the foregoing detailed description.

What is claimed:

1. A composite sandwich structure, comprising:
    a stiffening element including a plurality of randomly oriented fibers;
    a resin for binding the fibers, the resin having a strain-to-failure greater than approximately 6%; and
    at least one laminate facesheet joined to the stiffening element.

2. The composite sandwich structure of claim 1, wherein the fibers are carbon fibers arranged in, non-woven mat.

3. The composite sandwich structure of claim 1, wherein the fibers are glass fibers arranged in non-woven mat.

4. The composite sandwich structure of claim 1, wherein the laminate facesheet includes carbon fiber reinforced epoxy resin.

5. The composite sandwich structure of claim 1, wherein the stiffening element is a honeycomb core.

6. The composite sandwich structure of claim 1, wherein the resin includes benzoxazine.

7. The composite sandwich structure of claim 1, wherein the fibers constitute between approximately 20% and 65% by weight of the stiffening element.

8. A panel, comprising:
    a first facesheet;
    a second facesheet; and
    a core sandwiched between the first and second facesheets, the core including a plurality of randomly oriented non-woven fibers and a high strain resin binding the non-woven fibers together.

9. The panel of claim 8, wherein the fibers are carbon fibers.

10. The panel of claim 8, wherein the fibers are glass fibers.

11. The panel of claim 8, wherein:
    the core is a honeycomb core, and
    the high strain resin has a strain-to-failure of greater than approximately 6%.

12. The panel of claim 8, wherein the panel further comprises:
    a plurality of fibrids binding the randomly oriented fibers together.

13. A method of making a core for aircraft structures, comprising:
    forming fiber sheets containing at least one of glass fibers and carbon fibers, wherein the fibers constitute between approximately 20 to 65% by weight of the sheet, including binding the fibers using a resin having a strength-to-failure greater than approximately 6%, and wherein the fibers are randomly oriented;
    bonding two or more of the fiber sheets using an adhesive;
    curing the adhesive;
    forming cells between the fiber sheets by expanding the fiber sheets;
    applying a high strain resin to the two or more expanded fiber sheets; and
    curing the high strain resin.

14. The composite sandwich structure of claim 1 wherein the fibers comprise poly p-pheneylene-2,6-benzobisoxazole (PBO).

15. The composite sandwich structure of claim 14 wherein the PBO fibers are bound in a plurality of fibrids.

16. The panel of claim 8 wherein the resin comprises polybenzoxazine.

17. The panel of claim 8 wherein the fibers comprise poly p-pheneylene-2,6-benzobisoxazole (PBO).

18. The composite sandwich structure of claim 1, wherein the fibers are preimpregnated with the resin.

19. The composite sandwich structure of claim 1 further comprising a second facesheet.

20. A structure comprising:
    a stiffening element comprising a plurality of poly p-pheneylene-2,6-benzobisoxazole (PBO) fibers;
    a resin binding the PBO fibers, the resin comprising polybensoxazine; and
    at least one laminate facesheet joined to the stiffening element wherein the fibers are randomly oriented.

21. The structure of claim 20, wherein the resin and PBO fibers are bonded so as to comprise a strain-to-failure greater than approximately 6%.

22. The composite sandwich structure of claim 1 wherein the composite and face sheet comprise a panel.

23. The composite sandwich structure of claim 22 wherein the panel is disposed in an aircraft.

* * * * *